(12) United States Patent
Laackmann (10) Patent No.: US 9,811,695 B2
(45) Date of Patent: Nov. 7, 2017

(54) CHIP CARD ARRANGEMENT, CHIP CARD, APPARATUS FOR CONTACTLESS INTERACTION WITH A CHIP CARD ARRANGEMENT OR A CHIP CARD, AND METHOD FOR OPERATING AND METHOD FOR PRODUCING A CHIP CARD ARRANGEMENT OR CHIP CARD

(71) Applicant: Infineon Technologies AG, Neubiberg (DE)

(72) Inventor: Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 166 days.

(21) Appl. No.: 14/071,735

(22) Filed: Nov. 5, 2013

(65) Prior Publication Data
US 2014/0124571 A1   May 8, 2014

(30) Foreign Application Priority Data
Nov. 5, 2012  (DE) .................... 10 2012 110 531

(51) Int. Cl.
*G06K 7/10*     (2006.01)
*G06K 19/14*    (2006.01)
*G06K 7/00*     (2006.01)

(52) U.S. Cl.
CPC ....... *G06K 7/10257* (2013.01); *G06K 7/0004* (2013.01); *G06K 19/145* (2013.01)

(58) Field of Classification Search
CPC ......... G06K 19/06112; G06K 19/0723; G06K 19/0728; G06K 19/07309; G06K 19/07707; G06K 19/08; G06K 19/145; G06K 7/1097; G06K 7/10257; G06K 7/0004; G06K 19/07766; G06K 19/07767; G06K 19/083;
(Continued)

(56) References Cited

U.S. PATENT DOCUMENTS 7,487,914 B2 *  2/2009  Yoon ................... G06K 7/0004
                                                   235/435
7,837,119 B2    11/2010 Graf et al.
(Continued)

FOREIGN PATENT DOCUMENTS

CN       1517753 A    8/2004
CN       1799058 A    7/2006
(Continued)

OTHER PUBLICATIONS

English translation of JP 2005100357 (Apr. 14, 2005), http://worldwide.espacenet.com/publicationDetails/biblio?CC=JP&NR=2005100357A&KC=A&FT=D&ND=3&date=20050414&DB=EPODOC&locale=en_EP, retrieved Jul. 27, 2015.*
(Continued)

*Primary Examiner* — Suezu Ellis
(74) *Attorney, Agent, or Firm* — Viering, Jentschura & Partner mbB (57) ABSTRACT

In various embodiments, a chip card arrangement for carrying out contactless interaction with an external apparatus is provided. The chip card arrangement may include: a chip card, which has an electronic circuit, and having an optical coding element, which can be used to present an optically capturable code, wherein the electronic circuit is designed such that the interaction requires at least the code.

13 Claims, 4 Drawing Sheets

(58) Field of Classification Search
CPC .... G07F 7/0846; G07F 7/0893; G07F 7/0806; G07F 7/0833; G07F 7/084; G06Q 20/425
USPC .......................................... 235/492, 380, 487
See application file for complete search history.

(56) References Cited

U.S. PATENT DOCUMENTS

| | | | |
|---|---|---|---|
| 8,040,456 B2 | 10/2011 | Yamazaki et al. | |
| 8,820,639 B2* | 9/2014 | Haddock | G06K 19/16 235/375 |
| 9,165,295 B2* | 10/2015 | Kim | G06Q 20/3278 |
| 2003/0057276 A1 | 3/2003 | Appalucci et al. | |
| 2004/0056083 A1* | 3/2004 | Graf | G06K 19/07703 235/379 |
| 2004/0169786 A1* | 9/2004 | Yamazaki et al. | 349/61 |
| 2007/0063055 A1* | 3/2007 | Graf et al. | 235/492 |
| 2009/0307080 A1* | 12/2009 | Jain | G06Q 30/02 705/14.38 |
| 2011/0216022 A1* | 9/2011 | Kawamoto | G06F 3/041 345/173 |
| 2013/0048714 A1* | 2/2013 | Sharma | G06Q 20/346 235/379 |
| 2014/0266621 A1* | 9/2014 | Jones | G06K 7/10227 340/10.1 |
| 2015/0234525 A1* | 8/2015 | Yisraelian | G06F 3/0416 345/174 |

FOREIGN PATENT DOCUMENTS

| | | |
|---|---|---|
| DE | 102007051788 A1 | 5/2009 |
| JP | 2003317071 A | 11/2003 |
| JP | 2005100357 A * | 4/2005 |
| JP | 2005242872 A | 9/2005 |
| WO | 0046742 A1 | 8/2000 |

OTHER PUBLICATIONS

"Independent." Oxford English Dictionary. 2nd ed., 1989. http://www.oed.com/oed2/00115169. Accessed Dec. 11, 2016.*
Office Action received for German Patent Application No. 102012110531.6, dated Aug. 11, 2014 (for information purposes only), 6 pages.

* cited by examiner

Fig. 10

CHIP CARD ARRANGEMENT, CHIP CARD, APPARATUS FOR CONTACTLESS INTERACTION WITH A CHIP CARD ARRANGEMENT OR A CHIP CARD, AND METHOD FOR OPERATING AND METHOD FOR PRODUCING A CHIP CARD ARRANGEMENT OR CHIP CARD

CROSS-REFERENCE TO RELATED APPLICATION

This application claims priority to German Patent Application Serial No. 10 2012 110 531.6, which was filed Nov. 5, 2012, and is incorporated herein by reference in its entirety.

TECHNICAL FIELD

Various embodiments relate generally to a chip card arrangement and/or a chip card and/or an apparatus for contactless interaction with the chip card arrangement or the chip card. Various embodiments also relate to a method for operating the chip card arrangement or chip card and to a method for producing the chip card arrangement or chip card.

BACKGROUND

Today, contactless chip cards are regularly used for contactless authorization or payment processes. Such an authorization process may include a process of authenticating an entity and/or a process of authenticating oneself, for example. This contactless approach may involve a tradeoff between security and convenience, for example. In particular, if no additional security function (PIN input, fingerprint or the like) is used and/or no "expression of wishes" is provided, then handling may be very convenient. By way of example, the process may be in a form such that a chip card, for example accommodated in a wallet, does not even need to be removed from a bag or pocket, for example a tote bag, a pants pocket and/or the wallet. However, simple attacks can be carried out in order to steal from the holder of the chip card electronically or to use the chip card illegally for entry or the like. This may involve the use of trader terminals, for example, that are converted for mobile operation or it is possible to use relay attacks, for example, in which the radio link between the trader terminal and the chip card is extended artificially by means of a radio or GSM link. In both cases, the chip card of the victim is accessed from a short distance without his knowledge.

SUMMARY

In various embodiments, a chip card arrangement for carrying out contactless interaction with an external apparatus is provided. The chip card arrangement may include: a chip card, which has an electronic circuit, and having an optical coding element, which can be used to present an optically capturable code, wherein the electronic circuit is designed such that the interaction requires at least the code.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the detailed description that follows, reference is made to the appended drawings, which form part of this description and which show specific embodiments in which the invention can be executed for the purpose of illustration. In this respect, directional terminology such as "at the top", "at the bottom", "at the front", "at the rear", "front", "rear" etc. is used with reference to the orientation of the figure(s) described. Since components of embodiments can be positioned in a number of different orientations, the directional terminology is used for the purpose of illustration and is in no way restrictive. It goes without saying that other embodiments can be used and structural or logical changes made without departing from the scope of protection of the present invention. It goes without saying that the features of the various embodiments described herein can be combined with one another unless specifically stated otherwise. The following detailed description should therefore not be regarded as restrictive, and the scope of protection of the present invention is defined by the attached claims.

Within the context of this description, the terms "connected" and "coupled" are used to describe both direct and indirect connection, and also direct and indirect coupling.

In various embodiments, a chip card arrangement is provided that allows contactless authorization and/or payment processes easily and securely. In various embodiments, a chip card is provided that allows contactless authorization and/or payment processes easily and securely. In various embodiments, an apparatus for contactless interaction with a chip card arrangement and/or a chip card is provided that allows contactless authorization and/or payment processes easily and securely.

In various embodiments, a method for operating a chip card arrangement is provided that allows contactless authorization and/or payment processes by means of the chip card easily and securely.

In various embodiments, a method for operating a chip card is provided that allows contactless authorization and/or payment processes by means of the chip card easily and securely.

In various embodiments, a method for producing a chip card arrangement that allows contactless authorization and/or payment processes by means of the chip card arrangement or the chip card easily and securely is provided such that the chip card arrangement or the chip card can be produced easily and/or inexpensively.

In various embodiments, a method for producing a chip card that allows contactless authorization and/or payment processes by means of the chip card arrangement or the chip card easily and securely is provided such that the chip card arrangement or the chip card can be produced easily and/or inexpensively.

In various embodiments, a chip card arrangement for carrying out contactless interaction with an external apparatus is provided. The chip card arrangement has a chip card, which has an electronic circuit, and an optical coding element, which may be used to present an optically capturable code. The electronic circuit is in a form such that the interaction requires at least the code.

The chip card arrangement with the chip card and the optical coding element, particularly the code, may allow easy and/or secure contactless interaction with the chip card, for example without additional interaction, which would require knowledge, this not being available to a potential attacker (e.g. a PIN input or provision of the fingerprint), between the user and the terminal with which interaction is intended. By way of example, the interaction may comprise an authorization and/or payment process. The authorization process may include a process of authenticating an entity and/or a process of authenticating oneself, for example. The external apparatus may be an electronic payment system, for example an electronic cash system, an entry security system and/or an automated teller machine, for example. In addition, the chip card may also remain active before or after the contactless authorization and/or payment process. The use of a protective cover that blocks the electromagnetic field from a terminal (and also from an attacker) is also not absolutely necessary, since the optical coding element means that just simple bags/pockets or containers are sufficient to cover the code such that it is unreadable. In addition, the chip card is protected without the complexity of an additional electromagnetic field and/or without additional energy input. The chip card may be free of electronic elements that are used to protect or enable the chip card.

By way of example, the electronic circuit may have a chip and an antenna that is electrically coupled to the chip. By way of example, the chip may have a memory unit, a computation unit, for example a processor unit, for example a microprocessor, and/or a control unit. For the purpose of contactless interaction, the electronic circuit may have a reception and/or transmission element. The reception or transmission element may be based on RFID, for example. In this connection, the reception or transmission element can be called a transponder, for example. The transponder may be incorporated in the chip, for example. The computation unit may be set up to process stored or transferred data, for example. The memory unit may be set up to store data, for example. The data may have a content from the optical code and/or account and/or authorization data from the holder of the chip card, for example. The control unit may be set up to actuate the computation unit, the memory unit and/or the transponder, to release data or to prevent the data access, and/or to control the data interchange, for example. The chip may be set up to enable and/or prevent the authorization and/or payment process on the basis of the optical code, for example. By way of example, the chip may be set up to check whether the external apparatus knows the optical code, for example by checking the data transferred by the external apparatus, and to enable the authorization and/or payment process on the basis of the knowledge of the code.

In various embodiments, the optical coding element has a coding that has the code. The coding can easily contribute to presenting the optical code, for example without additional energy input. The coding may have one or more symbols, patterns and/or characters, for example.

In various embodiments, the coding has an optoelectronically readable print. The optoelectronic print easily allows the optical code to be presented.

In various embodiments, the optoelectronically readable print has a line code, a barcode or a 2D code. This may contribute to the code being easily capturable and/or readable.

In various embodiments, the optical coding element has a radiation source that may be used to present the code. By way of example, the radiation source may be used to project the code onto a sensitive area of a sensor unit for the purpose of capturing the code. By way of example, the radiation source may be a component that emits electromagnetic radiation, for example a light emitting diode (LED).

In various embodiments, the optical coding element is physically coupled to the chip card. By way of example, the optical coding element may be put and/or impressed onto the outside of a card body of the chip card or may be embedded into the chip card, for example below a transparent cover film on the chip card, so as to be optically recognizable from the outside.

In various embodiments, the optical coding element is at a physical distance from the chip card. By way of example, the optical coding element may be arranged on a carrier that is independent of the chip card. By way of example, the carrier may be a further card or a tag, for example a key fob. By way of example, this may contribute to the chip card being able to remain in a suitable container, for example a bag/pocket, for example a pants pocket, tote bag and/or wallet, during the interaction, which may contribute to a high level of security for the use of the chip card.

In various embodiments, an apparatus for contactless interaction with a chip card arrangement, for example the chip card arrangement explained above, is provided. The apparatus has a transmitter/receiver unit for communicating with an electronic circuit in the chip card arrangement and a sensor unit for optically capturing a code from the chip card arrangement. The apparatus is designed such that the interaction with the chip card arrangement takes place using the code. The apparatus allows the interaction with the chip card easily. For the interaction, the apparatus can read the code, for example, and use it as access authorization for accessing the chip card, for example the data stored on the chip card. Alternatively or in addition, the chip card can access the apparatus, for example data on the apparatus, following successful authorization by means of the code. The apparatus is external to the chip card, which means that the apparatus may also be called an external apparatus.

In various embodiments, the transmitter/receiver unit and the sensor unit are incorporated in one housing. The housing may be part of an electronic appliance, for example. The appliance may be an electronic cash system, an automated teller machine or an entry security system, for example.

In various embodiments, a chip card for carrying out contactless interaction with an external apparatus is provided. The chip card has a transponder, which is incorporated in the chip card, and an optical coding element, which presents an optically capturable code that needs to be known for the interaction. The external apparatus, the chip card, the transponder and/or the optical coding element may correspond to the external apparatus, the chip card, the transponder and/or the optical coding element that are explained above, for example.

In various embodiments, the optical coding element has a coding that has the code, wherein the coding has an optoelectronically readable print, for example, wherein the optoelectronically readable print has a line code, a barcode or a 2D code, for example.

In various embodiments, the optical coding element has a semiconductor component that emits electromagnetic radiation and that can be used to present the code.

In various embodiments, an apparatus for contactless interaction with a chip card, for example one of the chip cards explained above, is provided. By way of example, the apparatus may have a transmitter/receiver unit for communicating with the transponder in the chip card, and a sensor unit for optically capturing the code from the chip card, wherein knowledge of the code is necessary for the interaction. By way of example, the apparatus may correspond largely to the apparatus explained above and/or can be called an external apparatus in respect of the chip card.

In various embodiments, the transmitter/receiver unit and the optical sensor unit are incorporated in one electronic appliance. By way of example, the electronic appliance may include the apparatus.

In various embodiments, a method for operating a chip card arrangement, for example the chip card arrangement explained above, is provided. In this case, a code from the chip card arrangement is optically captured in order to carry out contactless interaction with an external apparatus. The code is used to carry out interaction with an electronic circuit in the chip card of the chip card arrangement.

In various embodiments, the code is presented by means of an optical coding element. By way of example, the optical coding element may have a radiation source for emitting electromagnetic radiation, and the radiation source may be used to project the code onto an area. The area may be a photosensitive region of the sensor unit, for example. Alternatively, the area may merely be situated in a field of view of the sensor unit.

In various embodiments, the code from the chip card is optically captured in order to carry out contactless interaction with the external apparatus. The code is used to carry out the interaction with the transponder in the chip card.

In various embodiments, a method for producing a chip card arrangement for carrying out contactless interaction with an external apparatus is provided. In this case, first of all a chip card that has an electronic circuit is provided. Furthermore, an optical coding element that can be used to present an optically capturable code is provided. The electronic circuit is designed such that the interaction requires at least the code.

In various embodiments, a method for producing a chip card for carrying out contactless interaction with an external apparatus is provided. In this case, a transponder is incorporated into a chip card. An optical coding element that presents an optically capturable code that needs to be known for the interaction is physically coupled to the chip card.

In various embodiments, a chip card may be a smart card or integrated circuit card (ICC). By way of example, the chip card can be actuated and/or read by means of an external apparatus, for example a card reader and/or an external terminal By way of example, the chip card is suitable for interacting and/or for carrying out interaction with the external apparatus. In various embodiments, the interaction includes, by way of example, communication and/or initiation and/or carrying-out, by way of example, of an authorization process, of a process of authenticating oneself, of a process of authenticating an entity, of a payment process and/or, by way of example, for releasing information and/or for enabling entry to a closed region, wherein the external apparatus may, in various embodiments, have a security double-door system, a point-of-sale terminal or an automated teller machine, for example.

Figure 1:
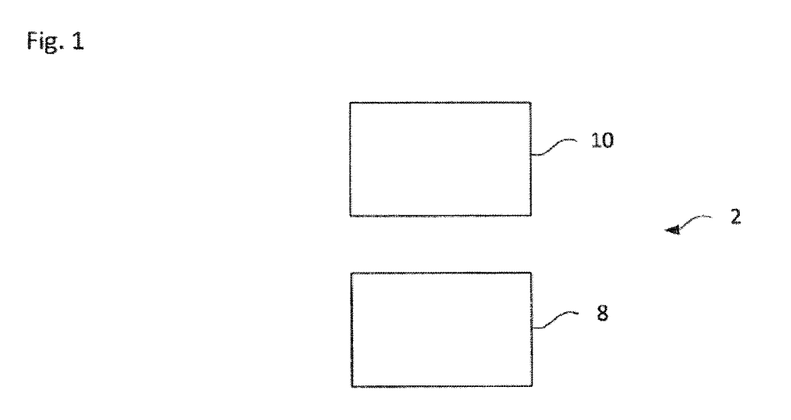
FIG. 1 shows a basic outline of an embodiment of a chip card arrangement.

FIG. 1 shows a basic outline of an embodiment of the chip card arrangement 2. The chip card arrangement 2 has an optical coding element 8 and a chip card 10. By way of example, the optical coding element 8 may be physically coupled to the chip card 10 or may be at a distance therefrom. By way of example, the optical coding element 8 may be put on or incorporated into the chip card 10. The optical coding element 8 may be used to optically present a code that is necessary for the interaction. The fact that the code may be presented may mean, by way of example, that it is presented permanently or that it is presented only intermittently, for example for the purpose of optically capturing the code. The code may be optically captured using an optical tool, for example a camera.

Figure 2:
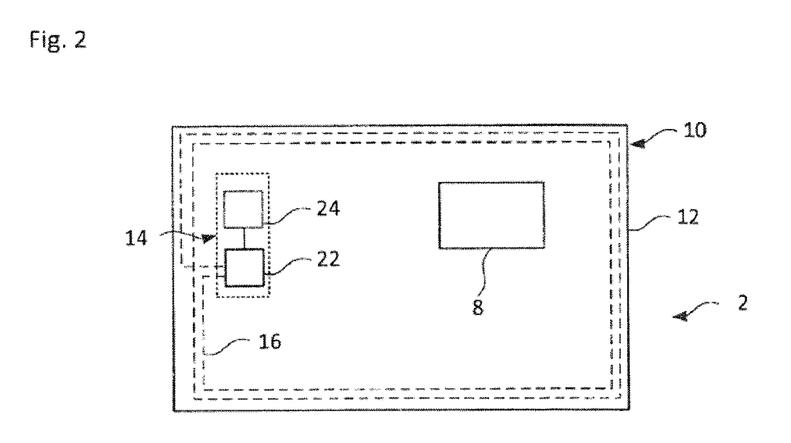
FIG. 2 shows an embodiment of a chip card arrangement.

FIG. 2 shows an embodiment of a chip card arrangement 2 that may correspond, in principle, for example, to the chip card arrangement 2 explained above. The chip card arrangement 2 has the chip card 10. The chip card 10 has a card body 12. The card body 12 is physically coupled to an electronic circuit 14 that may have a chip 22 and a transmitter 24, for example. In addition, the card body 12 may be physically coupled to an antenna 16. By way of example, the electronic circuit 14 and/or the antenna 16 may be incorporated in the card body 12. The chip 22 may be electrically coupled to the antenna 16, for example.

The chip 22 may have a computation unit, memory unit and/or control unit, for example. The computation unit may be set up to process stored or transferred data, for example. The memory unit may be set up to store data, for example. The data may have a content from the optical code and/or account and/or authorization data from the holder of the chip card 10, for example. The control unit may be set up to actuate the computation unit, the memory unit and/or the transponder 24, to release data or to prevent the data access, and/or to control the data interchange, for example. By way of example, the chip 22 may be set up to enable and/or prevent the authorization and/or payment process on the basis of the optical code. By way of example, the chip 22 may be set up to check whether the external apparatus 30 knows the optical code, for example by checking the data transferred by the external apparatus.

By way of example, the transponder 24 may have a reception and/or transmission element, this or these possibly being in the form of an RFID unit, for example. The transponder and the chip 22 are shown as separate units in FIG. 2 in order to improve presentation, but the transponder 24 may also be incorporated in the chip 22.

As an alternative to the direct electrical coupling of the chip 22 to the antenna 16, the chip 22 may be electrically coupled to a coil—not shown—rather than to the antenna 16, and the coil can then electromagnetically couple the chip 22 to the antenna 16. In this case, the antenna 16 may be arranged on the card body 12 or separately therefrom. This may also be called a "booster" or "coupling system". Furthermore, the chip 22 may additionally have a contact array that can also be used for contact-based access in addition to contactless access. The card body 12 is also physically coupled to the optical coding element 8. By way of example, the optical coding element 8 may be arranged such that it is visible from the outside. By way of example, the optical coding element 8 may be applied to the outside of the card body 12, for example stuck on, printed on or written on. Alternatively, the optical coding element 8 may be included in the card body 12, for example by means of printing, scoring, cutting, for example by means of laser. Alternatively, the optical coding element 8 may be incorporated in the card body 12 such that it is visible from the outside. By way of example, the optical coding element 8 may be covered by means of a transparent cover layer on the card body 12, as a result of which the code is optically capturable from the outside. By way of example, the optical coding element 8 may have a coding that, by way of example, may have one, two or more symbols and/or one, two or more print elements, for example an optoelectronically readable print.

Figure 3:
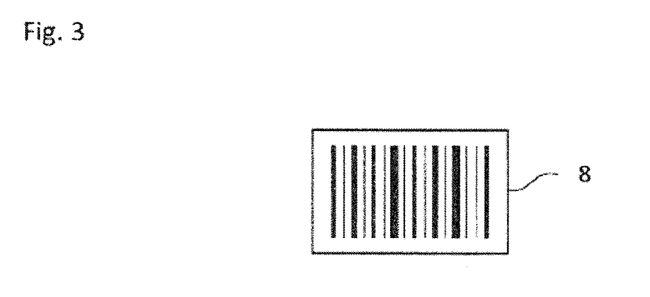
FIG. 3 shows an embodiment of an optical coding element.

FIG. 3 shows an embodiment of the optical coding element 8 in which the coding has an optoelectronically readable print. By way of example, the optoelectronically readable print may have a line code and/or barcode.

Figure 4:
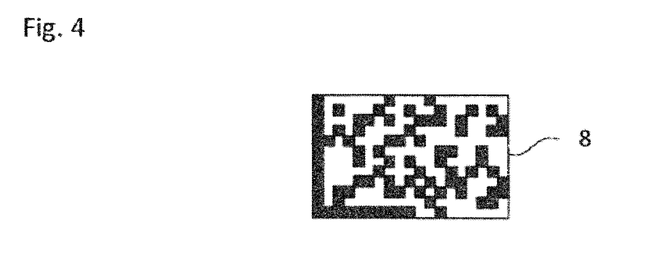
FIG. 4 shows an embodiment of an optical coding element.

FIG. 4 shows an embodiment of the optical coding element in which the coding has an optoelectronically readable print. By way of example, the optoelectronically readable print may have a 2D code.

Figure 5:
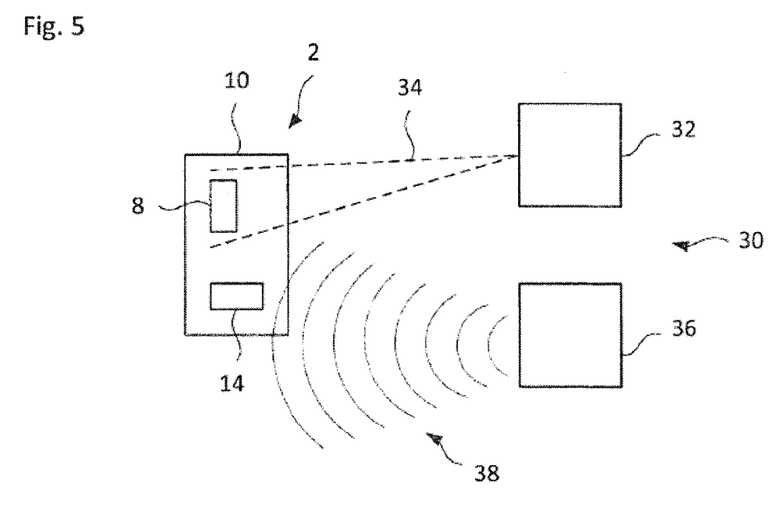
FIG. 5 shows an embodiment of a chip card arrangement and an embodiment of an external apparatus.

FIG. 5 shows an embodiment of the chip card arrangement 2 and an embodiment of an external apparatus 30 that interacts with the chip card arrangement 2. By way of example, the chip card arrangement 2 may correspond largely to the chip card arrangement 2 explained above. By way of example, the external apparatus 30 may have a sensor unit 32 for optically capturing the code from the optical coding element 8 and a transmitter/receiver unit 36 for sending and/or receiving data 38 to the electronic circuit 14 and/or from the electronic circuit 14. By way of example, the sensor unit 32 and the transmitter/receiver unit 36 may be incorporated in one housing and/or arranged at a distance from one another.

By way of example, the sensor unit 32 may have an optical sensor, for example a camera. By way of example, the sensor unit 32 may have a field of view 34 within which the sensor unit can be used to optically capture the code. Provided that the optical coding element 8 is situated in the field of view 34 of the sensor unit 32, it is therefore possible to use the sensor unit 32 to optically capture the code. By way of example, the code may be used to allow the interaction between the transmitter/receiver unit 36 and the electronic circuit 14, for example to initiate it. By way of example, security-related data may be interchanged and/or entry can be enabled only when the code is captured and/or used by the apparatus 30. By way of example, for a payment process, a customer or a vendor may arrange the chip card arrangement 2, particularly the optical coding element 8, in the field of view 34. By way of example, it is first of all possible for authentication data to be interchanged, which are intended to ensure that the external apparatus 30 and the chip card arrangement 2 are genuine. Data that are used for the actual payment process may then be interchanged in one or both directions. By way of example, the data may have the account number and/or credit card number of the account that is to be debited for the customer. In addition, the data may also have details about the actual payment process. The coupling of the code from the optical coding element with the actual payment process allows increased security to be achieved in comparison with a pure contactless payment process without authentication of the user and expression of wishes.

Figure 6:
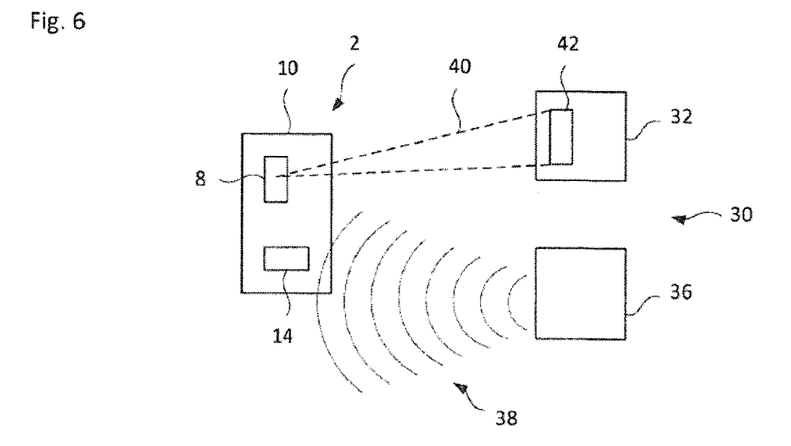
FIG. 6 shows an embodiment of a chip card arrangement and an embodiment of an external apparatus.

FIG. 6 shows an embodiment of the chip card arrangement 2 and an embodiment of the external apparatus 30 that, by way of example, may correspond largely to the chip card arrangements 2 and external apparatuses 3 explained above. By way of example, the optical coding element 8 may have a radiation source—not shown—that may be used to produce electromagnetic radiation and can be used to present the coding, for example the code. By way of example, the radiation source may be an LED. By way of example, the electromagnetic radiation can be radiated in a radiation region 40. By way of example, the electromagnetic radiation may have light in the visible range, in the UV range and/or in the infrared range. In order to present the code, the optical coding element 8 may have a mask and/or a shade structure, for example, that can be used to shade a portion of the electromagnetic radiation, as a result of which the code may be presented in a manner corresponding to the structures of the mask or the shade structure. By way of example, the radiation source may be switched on as required, for example by means of a switch, pushbutton or a contact sensor. It is therefore possible for the code to be presented only when required.

By way of example, the sensor unit 32 may have a sensitive area 42 onto which the code can be mapped provided that the sensitive area 42 is in the radiation region 40 of the optical coding element 8. By way of example, the sensitive area 42 may have photosensitive components that can form a camera, for example.

Figure 7:
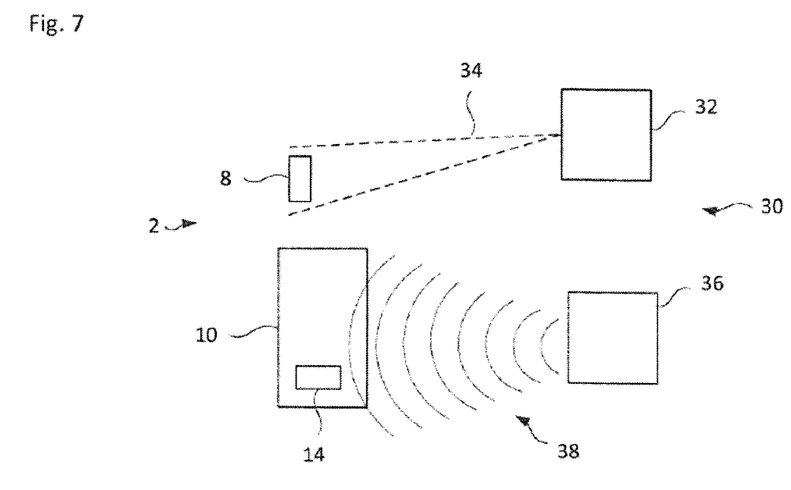
FIG. 7 shows an embodiment of a chip card arrangement and an embodiment of an external apparatus.

FIG. 7 shows an embodiment of the chip card arrangement 2 and the external apparatus 3, wherein the chip card arrangement 2 may, by way of example, correspond largely to one of the chip card arrangements 2 explained above and/or wherein the external apparatus 30 may, by way of example, correspond largely to one of the external apparatuses 30 explained above. By way of example, the optical coding element 8 may be arranged at a distance from the chip card 10. In other words, the optical coding element 8 may be physically independent of the chip card 10 and/or not physically coupled thereto. By way of example, the optical coding element 8 may be arranged on a further card, a tag, for example a key fob, and/or a sticker, which, by way of example, may be stuck on a bag/pocket, for example a wallet.

Figure 8:
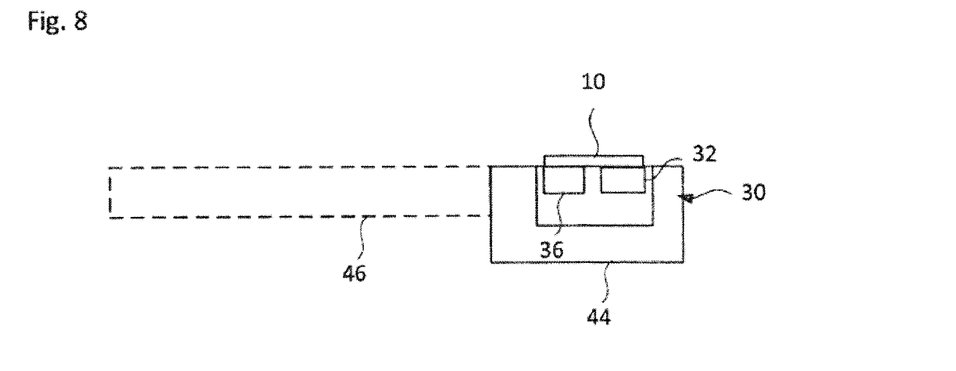
FIG. 8 shows an embodiment of a chip card arrangement and an embodiment of an external apparatus.

FIG. 8 shows an embodiment of the chip card arrangement 2 and an embodiment of the apparatus 30, wherein the chip card arrangement 2 may, by way of example, correspond largely to one of the chip card arrangements 2 explained above and/or the apparatus 30 may, by way of example, correspond largely to one of the apparatuses 30 explained above. By way of example, the external apparatus 30 may have a cash system 44. Optionally, an electrically operated conveyor belt 46 may be arranged on the cash system 44 for the purpose of transporting goods to the cash system 44. In order to initiate the payment process, the chip card 10 can be placed onto a sensor region of the cash system 44, for example, such that the sensor unit 32 may be used to optically capture the code and the transmitter/receiver unit 36 may be used to effect the interaction with the chip card 10.

Figure 9:
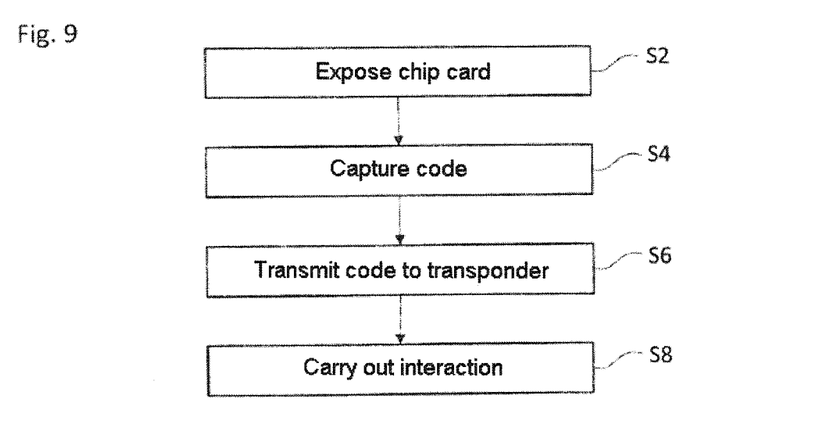
FIG. 9 shows a flowchart for an embodiment of a method for operating a chip card arrangement.

FIG. 9 shows a flowchart for an embodiment of a method for operating the chip card arrangement 2 and/or the chip card 10.

In a step S2, the chip card 2 may, by way of example, be exposed, for example if the optical coding element 8 is arranged on the chip card 10. By way of example, the chip card 10 may be situated in a bag/pocket and/or a protective cover, and the chip card 10 may be exposed by removing it from the relevant bag/pocket or cover. Alternatively, just the code can be exposed. By way of example, the bag/pocket or protective cover may have a window in which the code can be exposed without the need for the chip card 10 to be removed from the bag/pocket or cover. Alternatively, the code may be in a form that is independent of the chip card 10, for example as explained with reference to FIG. 7, as a result of which only the code needs to be exposed in step S2.

In a step S4, the code may be optically captured, for example. In this case, the code may be formed on the chip card 10 or on a further body, for example, or may be optically presented on the sensor unit 32, for example, by means of the chip card 10 and/or a further body.

In a step S6, the code may be transmitted to the transponder in the chip card 10, for example, which allows the interaction with the chip card 10. By way of example, a transaction process from the interaction may be designed such that knowledge of the optically readable code is required for a successful payment. By way of example, this can be achieved by virtue of the code directly presenting an entry code for the chip 22 or by virtue of a corresponding entry code being able to be calculated from the optical code by means of an additional key from the external apparatus 30. Only when the chip 22 is sent this entry code does it open up the entry for authentication of oneself that is required for payment. Alternatively or in addition, the optical code may be used to check authentication data that are sent by the chip 22. Only if the optical code and data sent by the chip 22 match (i.e. are dependent on one another, or each can decrypted using the other, or the like) is the chip card arrangement 2, for example the chip card 10, recognized as valid.

In a step S8, the interaction may be carried out.

Figure 10:
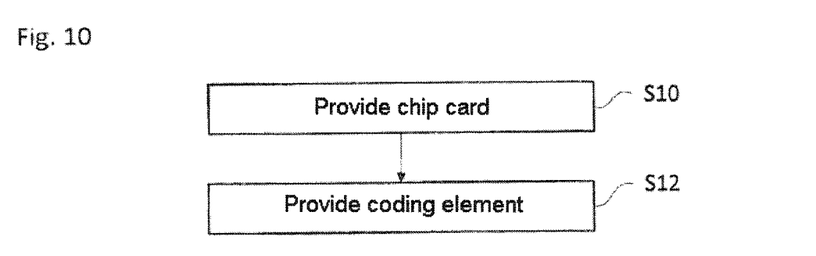
FIG. 10 shows a flowchart for an embodiment of a method for producing a chip card arrangement.

FIG. 10 shows a flowchart for an embodiment of a method for producing a chip card arrangement 2 and/or a chip card 10, for example one of the chip card arrangements or chip cards 10 explained above.

In a step S10, the chip card 10 may be provided, for example. By way of example, it is first of all possible to provide the card body 12 and it is then possible for the electronic circuit 14 and/or the antennas 16 to be arranged on and/or incorporated into the chip card 10.

In a step S12, the optical coding element 8 may be provided, for example. By way of example, the optical coding element 8 may be provided on or in the chip card 10 or independently of the chip card 10. By way of example, the code may be presented directly on the chip card 10 or directly on another of the bodies cited above. Alternatively or in addition, the code may be presented by means of the optical coding element 8, which has the radiation source, for example.

The invention is not limited to the embodiments shown. By way of example, the different embodiments can be combined with one another. By way of example, the chip cards 10 shown may have more or fewer electronic elements, for example memories processors, coils and/or antennas. By way of example, the chip may be electromagnetically coupled directly to the antenna 16. In addition, the embodiments shown in FIG. 6 and FIG. 7 may be combined, for example. By way of example, the optical coding element 8 may be arranged independently of the card body 12 and may have the radiation source for presenting the code. In addition, further optically readable prints may be used as coding. In addition, the optically readable prints can be combined. By way of example, a barcode can be combined with a 2D code. Alternatively or addition, the optically readable print may be combined with a radiation source for presenting the code. By way of example, one portion of the code can be presented as coding, for example as optically readable print, and another portion of the code can be presented by means of optical projection. In addition, the external apparatus 30 may have more or fewer electronic components. In addition, the external apparatus 30 may be part of an entry system and/or of an automated teller machine.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card arrangement for carrying out contactless interaction with an external apparatus, the chip card arrangement comprising:
    a chip card, which has an electronic circuit, and
    an optical coding element configured to present an optically capturable code to the external apparatus, wherein the optical coding element is configured to be independent of the chip card,
    wherein the electronic circuit is designed such that the interaction requires at least the code.

2. The chip card arrangement of claim 1,
    wherein the optical coding element has a coding that has the code.

3. The chip card arrangement of claim 2,
    wherein the coding has an optoelectronically readable print.

4. The chip card arrangement of claim 3,
    wherein the optoelectronically readable print has a line code, a barcode or a 2D code.

5. The chip card arrangement of claim 1,
    wherein the optical coding element has a radiation source that can be used to present the code.

6. A cash system apparatus for contactless interaction with a chip card arrangement, the cash system apparatus comprising:
    a transmitter and receiver for communicating with an electronic circuit in the chip card arrangement; and a camera comprising a sensor for optically capturing a code from the chip card arrangement; wherein the code is independent of a chip card within the chip card arrangement;

wherein the cash system apparatus is designed such that the contactless interaction with the chip card arrangement is effected using the code; and wherein the cash system apparatus is configured to initiate a payment process.

7. The cash system apparatus as claimed in claim 6, wherein the transmitter and receiver and the sensor are incorporated in one housing.

8. A chip card arrangement for carrying out contactless interaction with an external apparatus, the chip card arrangement comprising:

a chip card comprising a transponder; and an optical coding element, which presents an optically capturable code to the external apparatus where the optically capturable code needs to be known for the contactless interaction; wherein the optical coding element is configured to be independent of the chip card.

9. The chip card as claimed in claim 8, wherein the optical coding element has a coding that has the code.

10. The chip card as claimed in claim 9, wherein the coding has an optoelectronically readable print.

11. The chip card as claimed in claim 10, wherein the optoelectronically readable print has a line code, a barcode or a 2D code.

12. The chip card as claimed in claim 9, wherein the optical coding element has a semiconductor component that emits electromagnetic radiation and that can be used to present the code.

13. A method for operating a chip card arrangement, the method comprising:

carrying out contactless interaction with an external apparatus by optically capturing an optically capturable code from the chip card arrangement; wherein the chip card arrangement comprises a chip card and an optical coding element;

wherein the optical coding element is configured to be independent of the chip card; wherein the optically capturable code is presented by the optical coding element to the external apparatus; and using the code to carry out interaction with an electronic circuit in a chip card in the chip card arrangement.

\* \* \* \* \*